(12) United States Patent
Siegel (10) Patent No.: US 9,424,610 B1
(45) Date of Patent: Aug. 23, 2016

(54) METHOD AND APPARATUS FOR PERFORMING TRANSACTION ITEM IDENTIFICATION

(71) Applicant: MASTERCARD INTERNATIONAL INCORPORATED, Purchase, NY (US)

(72) Inventor: Harrison R. Siegel, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 21 days.

(21) Appl. No.: 14/636,601

(22) Filed: Mar. 3, 2015

(51) Int. Cl.
*G06Q 40/00* (2012.01)
*G06Q 10/08* (2012.01)

(52) U.S. Cl.
CPC ............ *G06Q 40/12* (2013.12); *G06Q 10/0875* (2013.01)

(58) Field of Classification Search
CPC ....... G06Q 40/12; G06Q 40/10; G06Q 40/00; G06Q 10/0875; G06Q 10/087; G06Q 10/0838; G06Q 20/10; G06Q 30/0601; G06Q 30/02; G06Q 30/06; G06Q 30/04
See application file for complete search history.

(56) References Cited

U.S. PATENT DOCUMENTS

2007/0260540 A1* 11/2007 Chau .................... G06Q 20/102
705/40
2013/0197991 A1* 8/2013 Basu .................. G06Q 30/0239
705/14.39

\* cited by examiner

*Primary Examiner* — Kristy A Haupt
(74) *Attorney, Agent, or Firm* — Seyfarth Shaw LLP; Brian Michaelis (57) ABSTRACT

System and methods for determining items purchased in a transaction are described. Transaction information, such as a transaction amount, transaction location, and merchant ID may be used to generate a pre-tax transaction amount. A website affiliated with a transacted merchant may be parsed to determine whether one or more single items, or combinations of items, have prices that alone or when summed equal the pre-tax transaction amount. The items may be assigned probability values based on clustering and consumer profiling and an item ID may be stored for each item having the highest probability value.

20 Claims, 9 Drawing Sheets

METHOD AND APPARATUS FOR PERFORMING TRANSACTION ITEM IDENTIFICATION

FIELD OF TECHNOLOGY

The present disclosure relates generally to transaction item identification, and more particularly to item identification using stored transaction information.

BACKGROUND

Millions of payment transactions are performed each day worldwide. When each transaction is performed, various types of macro-level information are stored, including a payment card or account number, which is typically anonymized, a merchant ID, a transaction amount, and the authorization time of the transaction. Many entities, including both private and governmental, may desire to use this information for various purposes, including economic analysis of consumer spending. However, the limited nature of such macro-level information being gathered provides very limited data to these entities such that they are unable to adequately understand or specifically report on various economic activities.

SUMMARY

The present disclosure describes systems and methods for expanding the data set of available transaction information in a special purpose payment network by performing item identification through automatic querying and analysis of merchant websites.

The present disclosure relates to a system and method for building an expanded transaction data set using a transaction data processor specifically configured to use available transaction information to determine and identify further transaction items and an expanded data set of information relating to the items involved in the transaction. The specially configured system includes a memory having a transaction information database and an itemized database, and a processor operatively coupled to the memory. The system may also include a persistent storage device operatively coupled to the memory that stores instructions that when loaded into the memory cause the processor to store transaction information within the transaction information database. The transaction information may include a merchant ID, a transaction amount, and a transaction location. The processor may also retrieve the transaction information pertaining to a single transaction, launch an automated process to determine a tax rate associated with the transaction, and generate a pre-tax transaction amount using the transaction amount and the tax rate. Moreover, the processor may also parse a website affiliated with information contained within the merchant ID, determine whether an item on the website has a price equal to the pre-tax transaction amount, and retrieve an item ID for the item having a price equal to the pre-tax transaction amount. Additionally, the processor may record the item ID within the itemized database, and gather and store other information about the item and/or transaction to build the expanded set of data relating to the transaction(s).

The specially configured transaction data processor may also profile a consumer account affiliated with a payment device used in the single transaction and determine whether combinations of items on the website have summed prices equal to the pre-tax transaction amount. Further, the processor may cluster the items according to their association with areas within a transacted merchant establishment and generate probability values for the combinations of items. The item ID recorded into the itemized database may include an item description and/or an item stock keeping unit (SKU) number. The tax rate for the transaction may be determined using a tax rate table contained within a database. The expanded transaction data set may be stored in the transaction information database and/or itemized database to provide a more robust set of information relating to a given transaction for further processing or analysis.

An aspect of the present disclosure relates to a method for identifying items of a transaction that includes recording transaction information to a transaction information database and retrieving at least a portion of the transaction information from the transaction information database. The at least a portion of the transaction information may be specific to a single transaction and may include a merchant ID, a transaction amount, and a transaction location. The method may also include determining a tax rate associated with the transaction, removing taxes applied during the transaction from the transaction amount, thereby producing a pre-tax transaction amount, and querying a website affiliated with a merchant involved in the transaction to determine whether one or more items each have a price identical to the pre-tax transaction amount and/or, clustering the one or more items in association with the pre-tax transaction amount. Additionally, the method may further include generating probability values for the one or more items, retrieving an item ID from the website that is associated with an item having the highest probability value, and recording the item ID, and such expanded/further information may be used in profiling a consumer account affiliated with a payment device used in the transaction.

Further, the method may include determining whether one or more combinations of two or more items have a summed price identical to the pre-tax transaction amount. The method may also include retrieving an item ID for each item within a combination of two or more items having the highest probability value. Determining the tax rate may include accessing a database having a table that includes tax rate information. Determining the tax rate may also include accessing a website containing tax rate information. Querying the website may include accessing a website affiliated with a merchant name contained within the merchant ID. Profiling the consumer account affiliated with the payment device may include analyzing previous transaction associated with the consumer account to determine a purchasing trend.

A further aspect of the present disclosure relates to a method for identifying an item of a transaction including accessing transaction information contained within a transaction information database and determining a pre-tax amount for the transaction. The transaction information may include a merchant ID and a transaction amount. The method may also include parsing a website affiliated with the merchant ID, determining whether one or more single items on the website have prices equal to the pre-tax amount, and determining an area within a transacted merchant establishment where the transaction occurred. Additionally, the method may include assigning a probability value to each of the one or more single items using the area within the transacted merchant establishment where the transaction occurred. Moreover, the method may include storing an item ID for an item having the probability value that is greater than the probability value of the other of the one or more single items.

Determining the pre-tax amount may include accessing a tax rate table including at least one of international, domestic, or local tax rate information. Determining the pre-tax amount may also include accessing a website having tax rate information. The method may also include determining a transaction type of the transaction. Determining the area within the merchant establishment where the transaction occurred may include determining a department within the transacted merchant establishment where the transaction occurred. Moreover, determining the area within the merchant establishment where the transaction occurred may include determining a point-of-sale within the transacted merchant establishment where the transaction occurred.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference number in different figures indicates similar or identical items or features.

DETAILED DESCRIPTION

The detailed description of aspects of the present disclosure set forth herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, references to a singular embodiment may include plural embodiments, and references to more than one component may include a singular embodiment.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In one or more embodiments, consumer processes may include an enrollment process. In enrollment, a consumer decides to participate. This may involve, for example, agreeing to legal terms with a payment network operator, card issuer, loyalty program operator or other program sponsor. This may involve a unified process or multiple separate processes with the various program operators. The consumer may agree, for example, to allow the program operator to monitor their purchases for purposes of comparison and/or assessment of credit worthiness.

Enrollment can be carried out in a variety of ways; for example, at a website or through a mobile app. There may be some item level consumer data that will not be factored even if the consumer does consent; for example, health care related items or items that indicate membership in some protected class. Use of item level data in all cases is consistent with current law and policy. Stated in another way, there is preferably no item-level analysis without the consumer's consent, and some data may not be appropriate for analysis even with the consumer's consent.

Appropriate usage limits are preferably placed on use of item-level data. Appropriate age limits are preferably enforced on those enrolling. Of course, all applicable laws, rules, regulations, policies and procedures with respect to age of consumers, privacy, and the like should always be fully complied with.

The present disclosure generally relates to systems and methods for determining item level or Stock Keeping Unit ("SKU") level data using information acquired from a consumer transaction and expanding a data set of available transaction information by gathering and/or inferring information from a transacted merchant's website. Typically, a transaction amount, transaction location, and information pertaining to a transacted merchant are acquired and stored for each transaction. According to the present disclosure, the tax applicable to a transaction may be determined and deducted from the transaction amount to produce a pre-tax transaction amount. A website affiliated with the transacted merchant may be queried and parsed to find single items or combinations of items having identical total prices to the pre-tax transaction amount. In so doing, the present disclosure assigns probability values to the single and combinations of items to determine the most likely item(s) purchased in the transaction. Once determined, item level or SKU level information of each item(s) is retrieved and stored expanding the data set of transaction information.

FIGS. 1A-1F illustrate a method 100 for identifying transaction items according to the present disclosure. At block 102 transaction information is recorded to a transaction information database. The transaction information database may include transaction information for multiple transactions. Moreover, the transaction information database may include information pertaining to both commercial and consumer transactions, and may further include information pertaining to transactions involving various types of payment devices or accounts. Additionally, the transaction information database may be partitioned by transaction and each transaction partition may include information, such as a merchant ID, a transaction total amount, a transaction location, and an authorization time of the transaction, for example. For illustration, the merchant ID may include information such as the name of the transacted merchant, the location (for example, department) within the merchant establishment where the transaction occurred, as well as the type of transaction involved, e.g., e-commerce (online), face-to-face (in store), cross-border, or any combination thereof, for example. If a face-to-face transaction is involved, the merchant ID may also provide the geographic location of the merchant establishment, e.g., the country, state, county, or town of the merchant establishment.

Figure 1A:
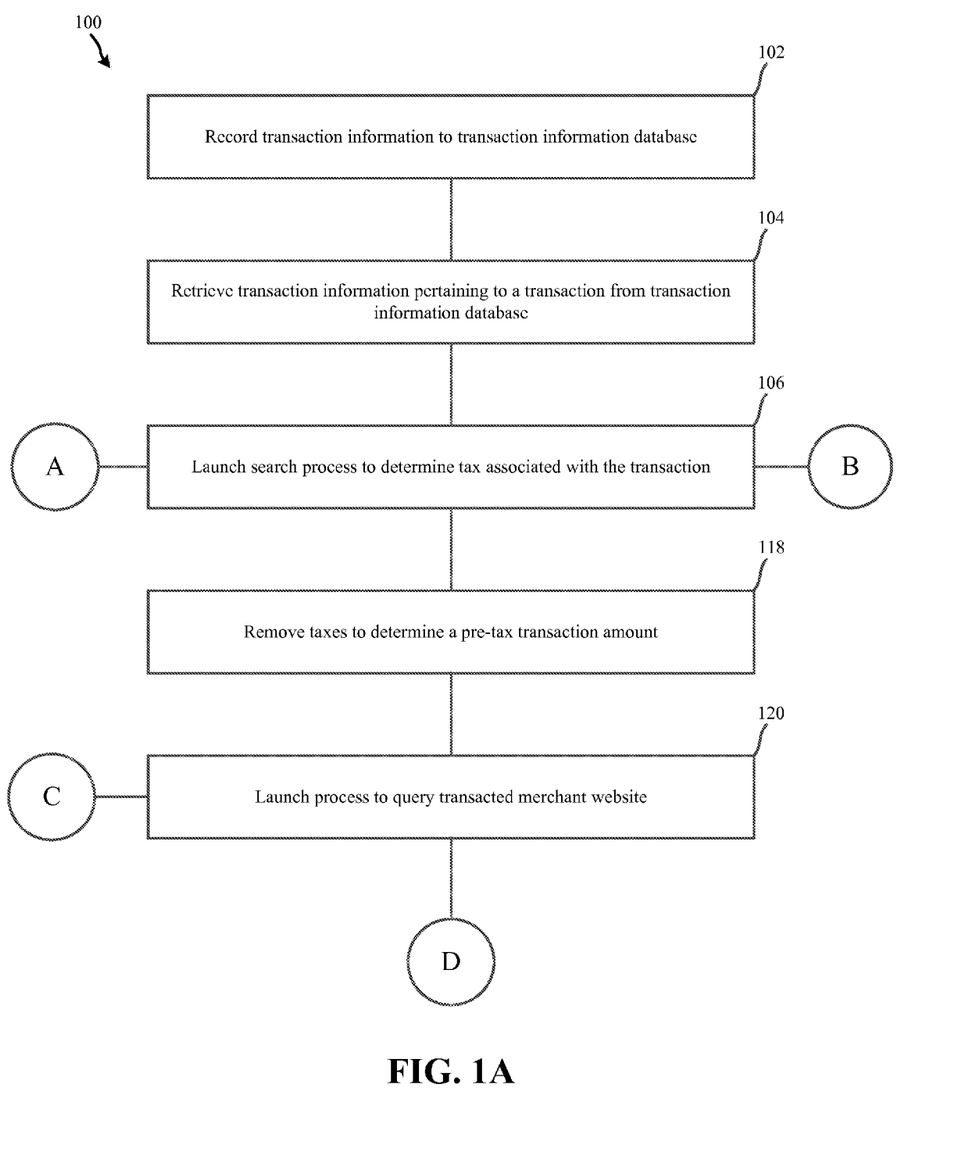
FIG. 1A is a process flow diagram detailing a method for identifying transaction items according to the present disclosure.
Figure 1B:
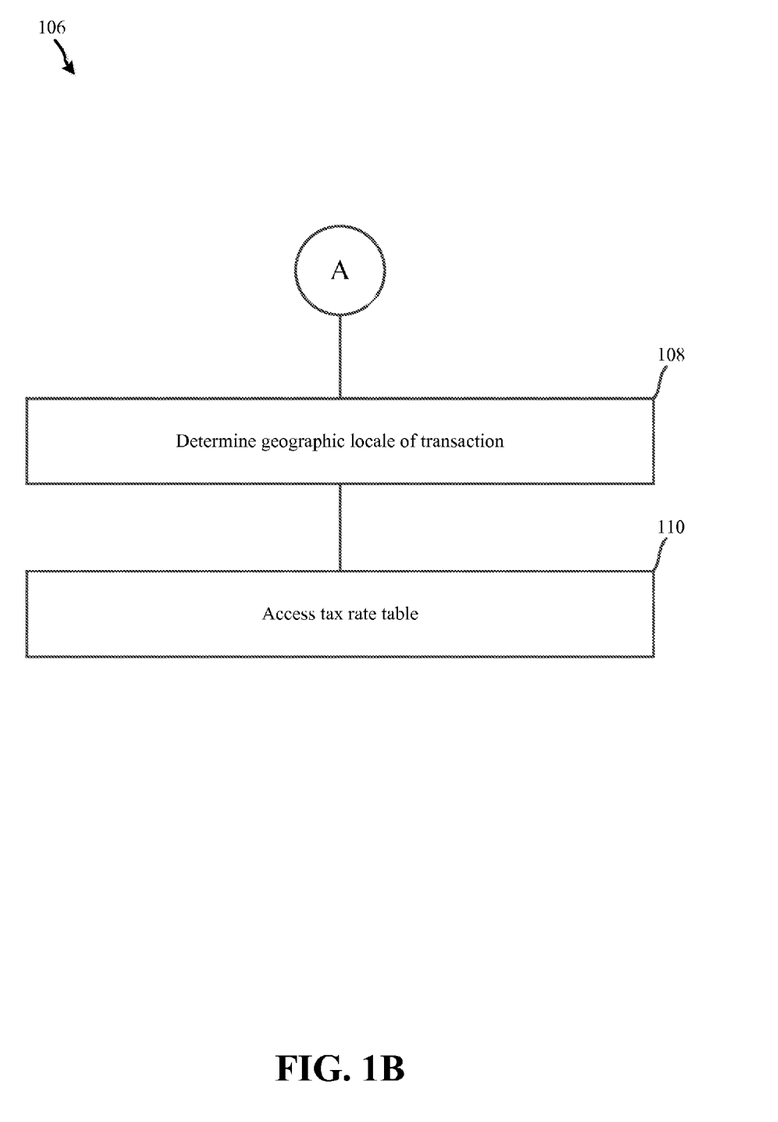
FIG. 1B is a process flow diagram detailing a method for determining a tax associated with a transaction according to the present disclosure.
Figure 1C:
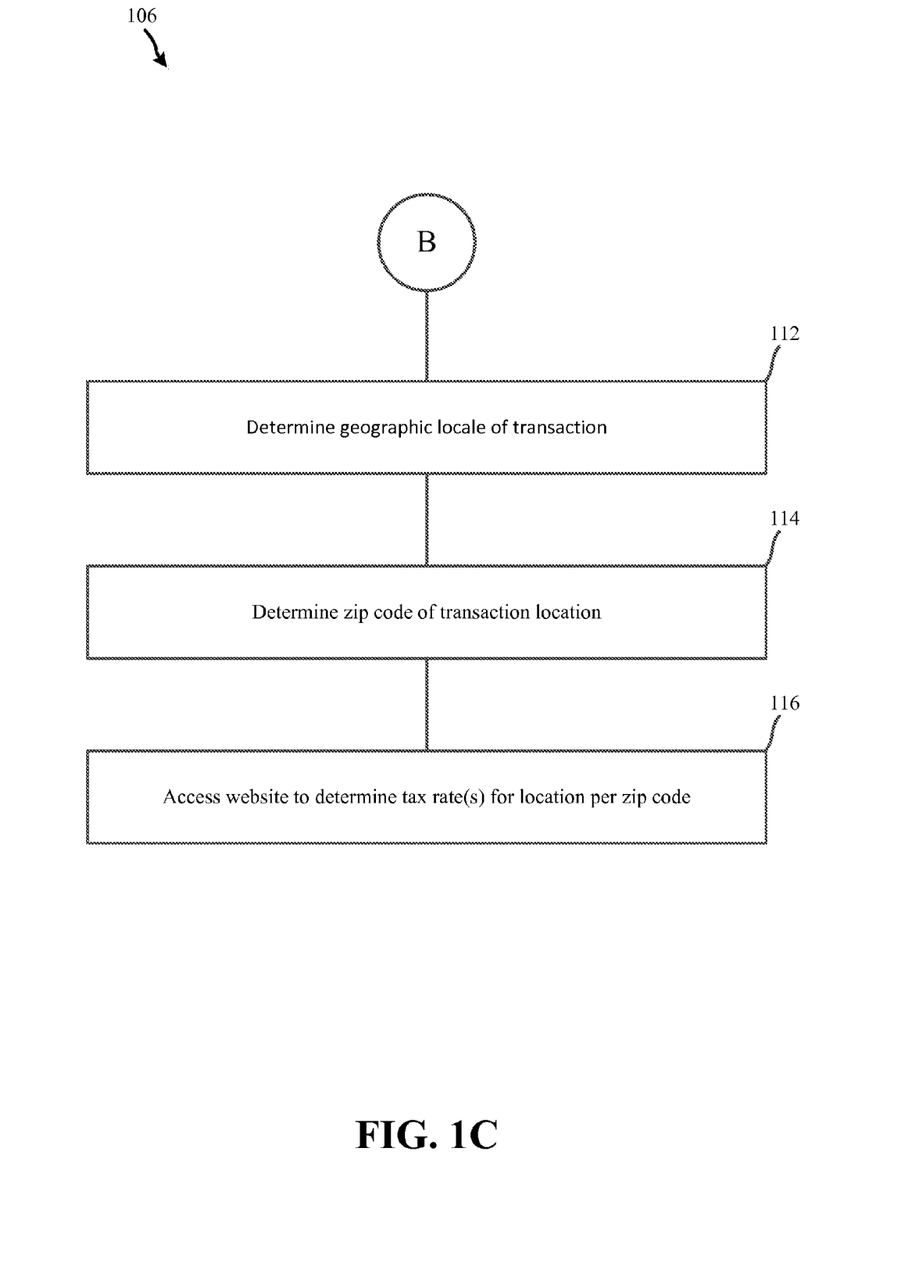
FIG. 1C is a process flow diagram detailing a method for determining a tax associated with a transaction according to the present disclosure.
Figure 1D:
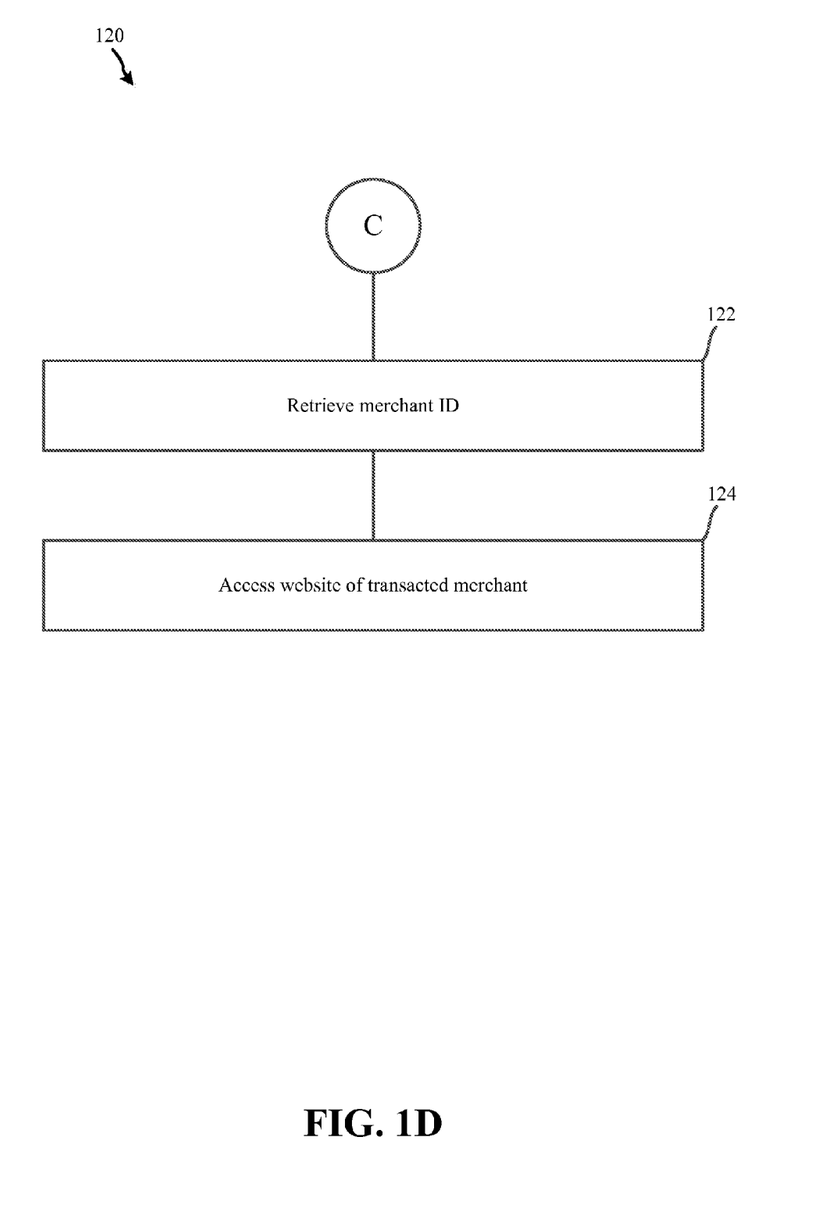
FIG. 1D is a process flow diagram detailing a method for accessing a specific merchant website according to the present disclosure.

At block 104 transaction information pertaining to a transaction is retrieved from the transaction information database. The transaction information retrieved may include, for example, the total transaction amount, the merchant ID, and the transaction location. If the merchant ID includes the geographic locale of the transacted merchant, the transaction location does not need to be separately retrieved.

At block 106 a search process, for example implemented in program code, that determines the tax associated with the transaction is launched. This search process may be a localized search ("A" illustrated with reference to FIG. 1B). At block 108 of a localized search, the geographic locale of the transaction, obtained from either the merchant ID and/or the separately retrieved transaction location information, is determined. At block 110 a tax rate table within the transaction information database or within a separate database is accessed. The tax rate table may contain up-to-date tax information partitioned according to localized geographic areas, e.g., zip codes, with single tax rates for particularized transaction, e.g., e-commerce, face-to-face, and cross-border. The tax rate table may contain information on international, state, and local taxes, for example. Alternatively, the search process may be program code that implements a remote, e.g., web-based, search ("B" illustrated with reference to FIG. 1C). At block 112 of a remote search, similar to block 108 of the localized search, the geographic locale of the transaction, obtained from either the merchant ID and/or the separately retrieved transaction location information, is determined. At block 114 the zip code, or other relevant geographic descriptor in the case of an international transaction, of the transaction is determined. At block 116 a website is accessed to determine the tax rate(s) for the transaction using the zip code or other relevant geographic descriptor determined at block 114. Determining the tax rate may include first determining the type of transaction, e.g., e-commerce (online), face-to-face (in store), cross-border, or any combination thereof, because different types of transactions may have different tax rates within a single geographic area. One way to determine the type of transaction is to analyze the merchant ID and transaction location information. For example, if the merchant ID denotes a certain zip code, city, or register at the transacted merchant, the transaction may be considered a face-to-face transaction. If, however, the merchant ID denotes the transaction occurred through a website, the transaction may be considered an e-commerce transaction.

Referring back to FIG. 1A, at block 118 the taxes are removed from the transaction amount, thereby producing a pre-tax transaction amount. This may include multiplying the tax rate determined at block 106 with the transaction amount to calculate the amount of taxes associated with the transaction. This amount of taxes may then be subtracted from the transaction amount.

At block 120 a process, as implemented in program code, to query a website affiliated with the transacted merchant is launched. This querying process may include parsing, or analyzing and reading the text contained within, the website's pages, with attention being directed towards the description and price of the items referenced therein. The website searched should be one affiliated with the transacted merchant. Thus, at block 122 (illustrated in FIG. 1D) the merchant ID for the transaction is retrieved. Using the information provided in the merchant ID, the transacted merchant's website may be accessed (illustrated as block 124).

Figure 1E:
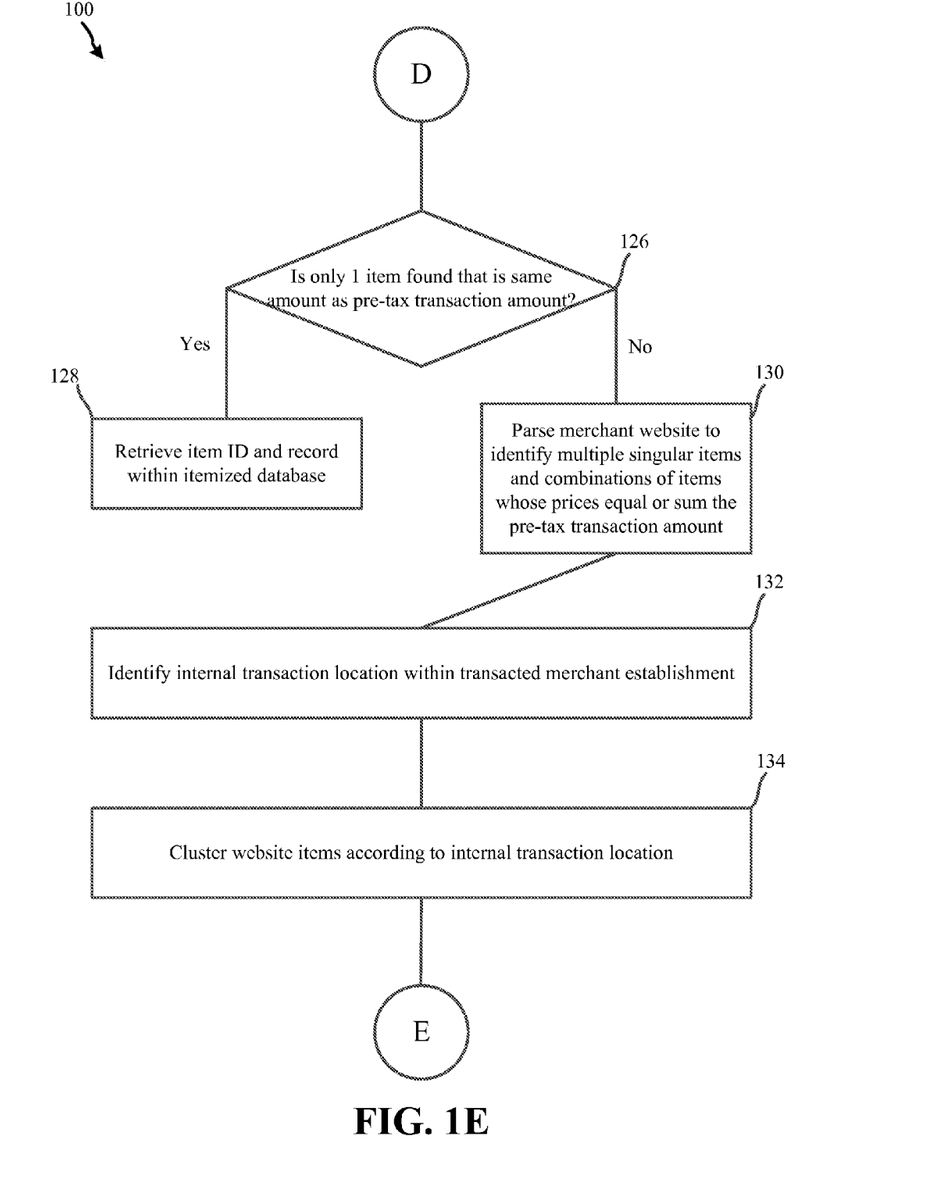
FIG. 1E is a process flow diagram detailing a method for identifying transaction items according to the present disclosure.

Referring now to FIG. 1E, at decision block 126 it is determined whether only one item on the website has a price identical to the pre-tax transaction amount. If only one item on the website has a price identical to the pre-tax transaction amount, an item ID specific to that item is retrieved and recorded within an itemized database (illustrated as block 128). The item ID may include various information, such as the name and general description of the item, the price of the item, and the Stock Keeping Unit ("SKU") of the item, for example.

If, however, more than one item has a price identical to that of the pre-tax transaction amount, or combinations of two or more items have a summed price equal to the pre-tax transaction amount, then the website is parsed to identify those lone or combinations of items and probability values are assigned associated with the likelihood the lone or combinations of items were purchased in the transaction (illustrated as block 130). The probability values may be numerical, e.g., 0 to 1, or non-numerical, e.g., unsure to certain. Single items having prices equal to the pre-tax transaction amount may receive higher probability values than combinations of items having summed prices equal to the pre-tax amount. Moreover, combinations with lower numbers of items may receive higher probability values than combinations with higher numbers of items. For example, an item having a price identical to the pre-tax amount may receive a higher probability than a combination having two items, a combination having two items may receive a higher probability than a combination having three items, and so on.

Further, to produce accurate probability values, an internal transaction location within the transacted merchant establishment may be identified (illustrated as block 132). This internal transaction location may be obtained from the merchant ID. Further, the internal transaction location may be specific to a department of the establishment, e.g., electronics, home goods, clothing, etc., or may be specific to a Point-Of-Sale ("POS") terminal or register. If the internal transaction location is known, and multiple items each have a price identical to the pre-tax transaction amount, an item associated with the internal transaction location may receive a higher probability value than an item not associated with the internal transaction location. Moreover, when combining items whose summed prices equal the pre-tax transaction amount, items may be "clustered" according to known techniques (illustrated as block 134). Traditionally, consumers purchase items that relate to each other, i.e., items that are in the same genre. Thus, for example, if electronics or a point-of-sale terminal within electronics is indicated as the internal transaction location, items sold within the electronics department may be clustered, thereby giving them a higher probability value of being part of the transaction. Conversely, items on the merchant website that are not part of the electronics department will be given lower probability values of being part of the transaction. That is to say, item combinations only having items associated with the internal transaction location may receive higher probability values than combinations with only some or no items associated with the internal transaction location. For example, it may be more likely that a TV and a DVD player are purchased together than a TV and a toaster.

Figure 1F:
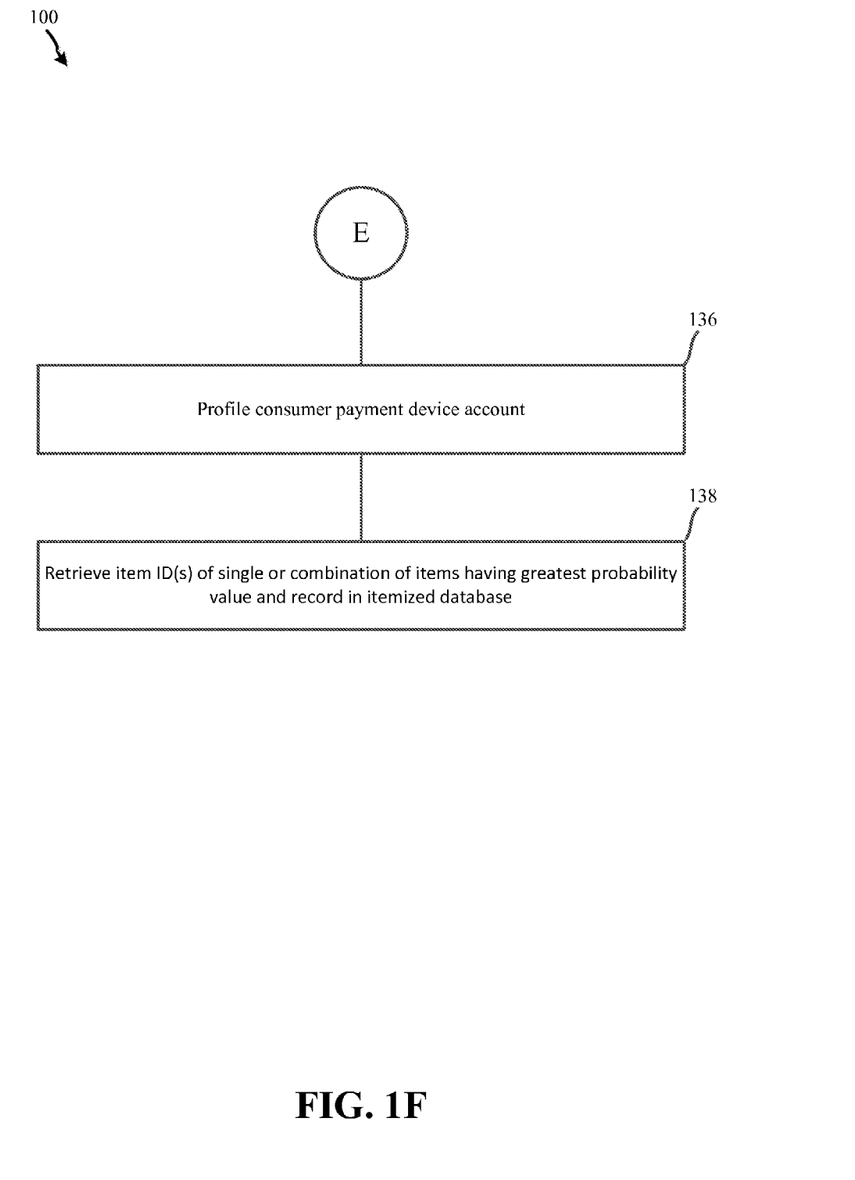
FIG. 1F is a process flow diagram detailing a method for identifying transaction items according to the present disclosure.

To even further assist in producing accurate probability values, a consumer account affiliated with a payment device used in the transaction may be profiled (illustrated as block 136 in FIG. 1F). That is, previous transaction records of the payment device may be analyzed to determine a purchasing trend. For example, if a recent purchase occurred at a kitchen supply store, it may be assumed that at another store shortly thereafter the consumer is more likely to purchase a toaster than a television. The duration of the previous transactions analyzed may be the duration of the payment device, or some shorter time determined to be more relevant to the analysis.

At block 138 in FIG. 1F the item ID(s) of a single item or of each item contained within the combination, depending on whether the single item or the combination has the highest probability value, is retrieved and recorded within an itemized database. The item ID may include various pieces of information, such as the name and general description of the item, the price of the item, and the Stock Keeping Unit ("SKU") of the item, for example.

While it has been described that the item ID(s) retrieved is affiliated with the item or combination of items having the highest probability value, a threshold probability value may be implemented. Thus, if the highest probability value determined does not meet or exceed the threshold probability value, no item ID may be recorded in the itemized database. This may be done to ensure accuracy of the information contained within the itemized database.

Figure 2:
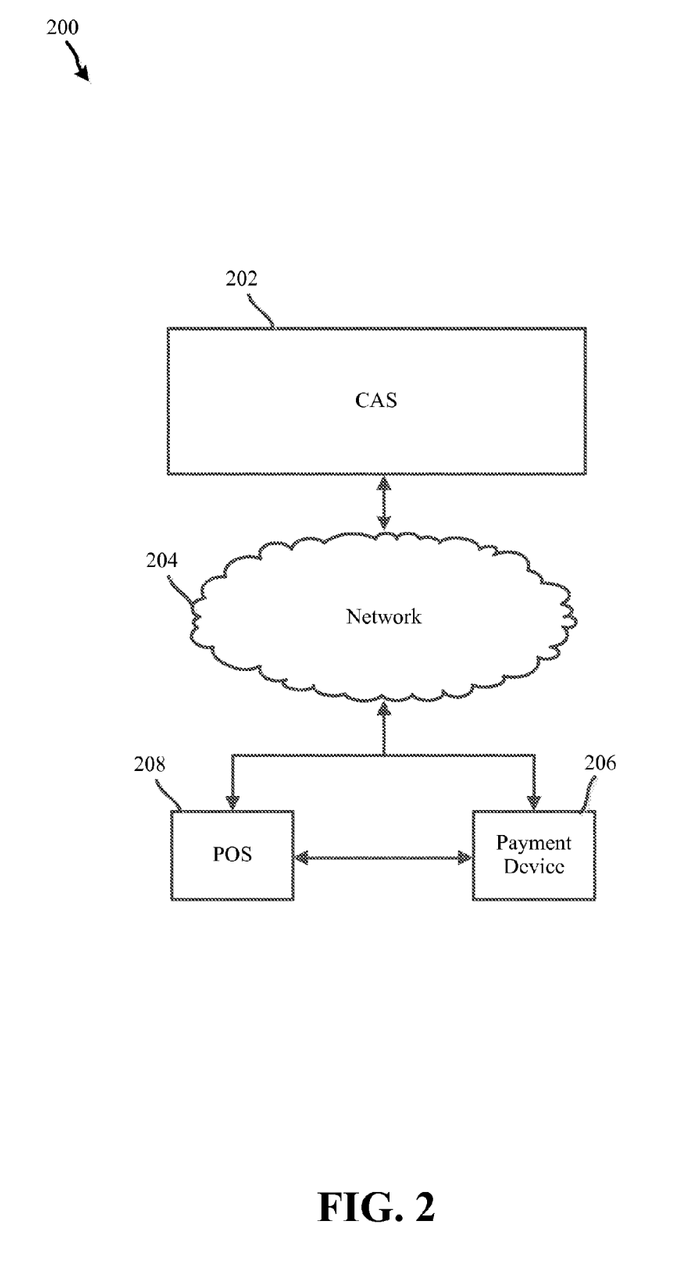
FIG. 2 is a block diagram detailing a system for processing transactions according to the present disclosure.

FIG. 2 illustrates a system 200 for processing a transaction according to the present disclosure. The system 200 may include a Card Authorization System ("CAS") 202 (also known as an account authorization system) configured to receive transaction information and facilitate the transaction, a network 204 for communication to/from the CAS 202, a payment device 206 for a consumer to effect the transaction, and a merchant point-of-sale device 208 that represents the situs at which the transaction is initiated. The various system components may communicate via the network 204 or multiple networks may be implemented and in communication.

The CAS 202 may be configured to perform all or part of an authorization process in relation to a transaction associated with the payment device 206. The CAS 202 may be any combination of hardware and software, such as servers, databases, firewalls, computers, etc., in order to authorize transactions. Illustratively, the CAS 202 may be operated by a payment processor (e.g., payment device account issuer). Additionally, the CAS 202 may be configured to access/retrieve information from, and record information to the transaction information data warehouse and the itemized data warehouse, described in greater detail herein.

Figure 3:
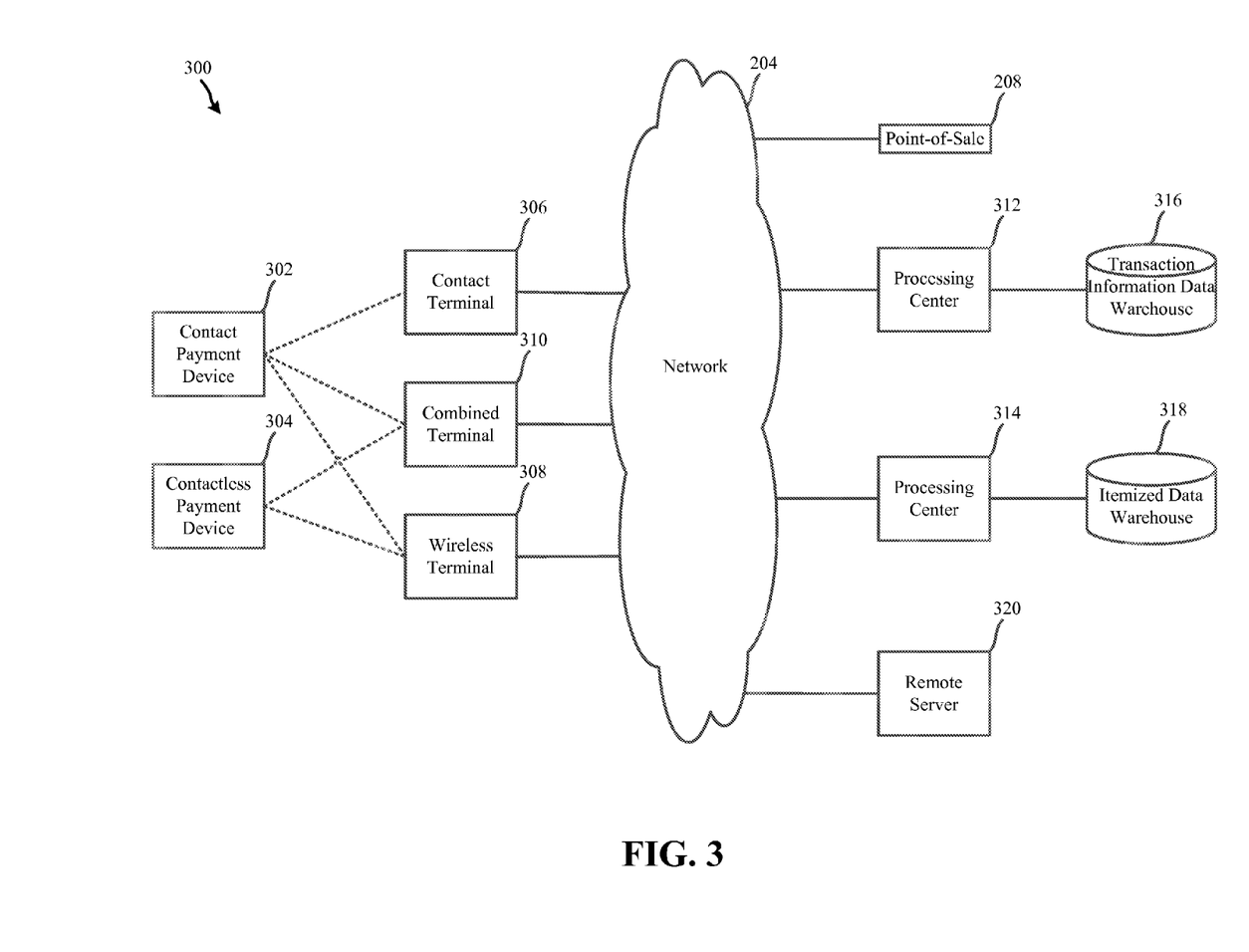
FIG. 3 is a block diagram detailing a system for processing transactions and for item identification according to the present disclosure.

FIG. 3 illustrates a system 300, within which payment devices according to the present disclosure may be used, and/or within which item identification according to the present disclosure may be carried out. The system 300 may include one or more different types of payment devices, for example contact and/or contactless payment devices 302, 304, used to facilitate transactions by a user with a terminal, such as the contact, wireless, or combined terminals 306, 308, 310 described in detail hereafter. The contact device 302 may be a device that interacts with transaction terminals using physical communication. Thus, the contact device 302 may have a magnetic stripe. The contactless device 304 may be a device that interacts with transaction terminals without physical communication. Thus, the contactless device 304 may have an antenna that provides for contactless communication, such as by using radio frequency (RF) electromagnetic waves, for example. The contactless device 304 may also include one or more oscillators, and/or additional appropriate circuitry for one or more of modulation, demodulation, down conversion, and the like. Each of the payment devices 302, 304 may contain an integrated circuit ("IC") chip having a processor portion and a memory portion. The ICs may also include one or more of control logic, a timer, and input/output ports. Such elements are well known in the IC art and are not separately illustrated. One or both of the ICs may also include a co-processor, again, well-known and not separately illustrated. The control logic may provide, in conjunction with the processing portion, the control necessary to handle communications between the memory portion and the input/output ports. The timer may provide a timing reference signal from the processing portion and the control logic. The co-processor may provide the ability to perform complex computations in real time, such as those required by cryptographic algorithms.

The memory portions of both the payment devices 302, 304 may include different types of memory, such as volatile and non-volatile/flash memory and read-only and programmable memory. The memory portions may store the operating system of the devices 302, 304. The operating system loads and executes applications and provides file management or other basic device services to the applications. One operating system that may be used is the MULTOS® operating system licensed by MAOSCO Limited. (MAOSCO Limited. St. Andrews House, The Links, Kelvin Close, Birchwood, Warrington, WA3 7PB. United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, may be employed. The operating system may be stored in read-only memory ("ROM") within the memory portion.

In addition to the basic services provided by the operating system, the memory portions may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that, strictly speaking, the EMV specification defines the behavior of a terminal; however, the payment device may be configured to conform to such EMV-compliant terminal behavior and in this sense is itself EMV-compliant. It will be appreciated that applications may be configured in a variety of different ways.

A number of different types of terminals may be employed within the system 300. Such terminals may include the contact terminal 306 configured to interface with the contact payment device 302, through means such as a magnetic stripe terminal. The wireless terminal 308 may also be employed, which may be configured to interface with both the contact and contactless devices 302, 304. Additionally, the combined terminal 310, designed to interface with both the contact device 302 as well as the contactless device 304, may also be included within the system 300. In operation, the contact payment device 302 may be swiped on the contact terminal 306, or may be touched or tapped on the wireless or combined terminals 308, 310, which then contactlessly transmits the electronic data to the proximity IC chip in the contact payment device 302. Thus, the above-described payment devices 302, 304 may be ISO 7816-compliant contact cards or devices or NFC (Near Field Communications) or ISO 14443-compliant proximity cards or devices.

The combined terminal 310 may include a memory, a processor portion, a reader module, and optionally an item interface module such as a bar code scanner and/or a radio frequency identification (RFID) tag reader. The memory, reader module, bar code scanner, and RFID tag reader may be coupled to the processor. Note that the principles of construction of the combined terminal 310 are applicable to other terminals 306, 308 and are described in detail for illustrative purposes. The reader module may be configured for contact communication with the contact payment device 302, through means such as a magnetic stripe, contactless communication with the contactless payment device 304, or a combination of any two or more of the foregoing (different types of readers may be provided to interact with different types of payment devices).

The terminals 306, 308, 310 may function via hardware techniques in the processor portion, or by program instructions stored in the memory. Such logic could optionally be provided from a central location such as one of the processing centers 312, 314 over the network 204.

The one or more processing centers 312, 314 may be connected to the terminals 306, 308, 310 via the network 204. The network 204 may include, for example, the Internet, or a proprietary network. Moreover, more than one network 204 may be employed to connect different elements of the system 300. The processing centers 312, 314 may include, for example, a host computer of an issuer of a payment device, such as the contact and contactless payment devices 302, 304.

Because a large amount of financial services (e.g. credit card and payment processing) data may at times be subject to various strict privacy policies, regulations or statutes governing the storage and communication of such information, aspects of the present disclosure include systems that may not be configured in a standard technical environment using only standard communication techniques, conventional general purpose computer networks and communication equipment, for example. Rather, aspects of the present disclosure may provide substantial improvements to the conventional technical environments for accessing, storing and/or communicating credit card or payment processing information that include special purpose computer hardware, software, algorithms and/or communication techniques to secure and/or de-identify data and/or to ensure that data is accessed, communicated and stored in a manner that maintains its security and privacy. For example, the system may include special purpose computer hardware, software, algorithms and/or communication techniques or portions thereof that may be implemented by only a small number of industry stakeholders such as credit card issuers or payment processors to ensure data privacy.

Many different retail or other establishments, represented collectively by the point-of-sale 208, may be connected to the network 204. In one or more instances, various establishments may interface with a telecommunications network, such as a virtual private network, via one or more machines which are then connected to the network 204. Each such establishment may have one or more terminals, such as the contact, wireless, and combined terminals 306, 308, 310 described above.

The processing center 312 may be in communication with a database such as the transaction information data warehouse 316, which may contain transaction information including, for example, total transaction amount, a merchant ID associated with the transaction, and the transaction location. The processing center 314 may be in communication with a database such as the itemized data warehouse 318, which may contain, separately or in addition to the information in the transaction information data warehouse, information relating to particular items involved in various transactions. It should be appreciated that the data warehouses 316, 318 may be in communication with a single processing center or multiple processing centers without departing from the scope of the present disclosure. The processing centers 312, 314 may be operably connected in order to share information. For example, the processing centers 312, 314 may be connected to allow the interchange of information contained within the data warehouses 316, 318 and the remote server 320.

The remote server 320 may contain information representative of various websites accessible using the Internet. For example, the remote server 320 may contain information with respect to various retailers/merchants who engage in consumer-present and consumer-not-present transactions. Such information contained within the remote server 320 may include information such as, for example, product/item description and product/item pricing.

Figure 4:
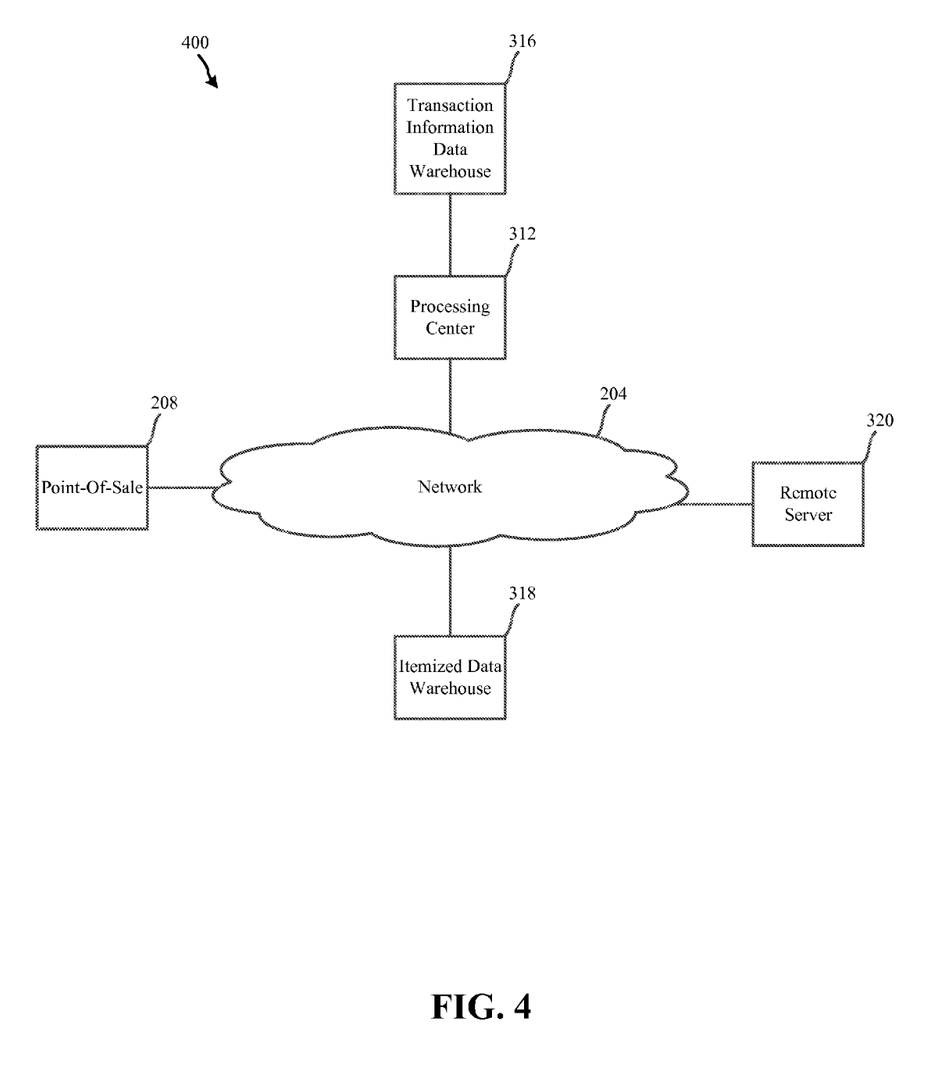
FIG. 4 a block diagram detailing a system for performing item identification using a merchant website according to the present disclosure.

FIG. 4 illustrates a system 400 for performing item identification using a merchant website. The system 400 may include the network 204 to which is connected the point-of-sale 208, the processing center 312, the remote server 320, and the itemized data warehouse 318. While one processing center 312 is illustrated, it should be appreciated that more than one processing center may be utilized. The system 400 further includes the transaction information data warehouse 316 connected to the processing center 312. As illustrated, the transaction information data warehouse 316 is in direct communication with the processing center 312 and the itemized data warehouse 318 is in indirect communication with the processing center 312 via the network 204. However, it should be appreciated that the data warehouses 316, 318 may both be in either direct or indirect communicate with the processing center 312 without departing from the scope of the present disclosure.

The point-of-sale 208 may be any location capable of performing a transaction between a consumer and a merchant. For example, the point-of-sale 208 may be a merchant establishment, such as a retail store, or an e-commerce forum, such as a website. Upon the point-of-sale 208 performing a transaction between the consumer and the merchant, the processing center 312 may retrieve various pieces of transaction information from the point-of-sale 208 via the network 204 and record the various pieces of transaction information in the transaction information data warehouse 316. The transaction information may include data, such as a merchant ID, a transaction amount, and a transaction authorization time, for example. The merchant ID may include such information as the name of the transacted merchant, the location within the merchant establishment where the transaction occurred, as well as the type of transaction involved, e.g., e-commerce (online), face-to-face (in store), cross-border, or any combination thereof, for example. If the transaction was a face-to-face transaction, i.e., a consumer present transaction, the merchant ID may further provide the geographic locale of the transacted merchant, e.g., the country, state, county, or town of the transacted merchant establishment.

The processing center 312 may also be configured to retrieve information from the transaction information database, such as, for example, the transaction amount, the merchant ID associated with the transaction, and the transaction location. If the merchant ID includes the geographic locale of the transacted merchant establishment, the processing center 312 does not need to separately retrieve the transaction location information from the transaction information data warehouse 316.

The processing center 312 may be configured to determine the tax associated with the transaction using the merchant ID and/or the transaction location information. In one instance, the processing center 312 may perform a localized search whereby the tax associated with the transaction is determined using a tax rate table located within the transaction information database or within a separate database. The tax rate table may contain up-to-date tax information partitioned according to localized geographic areas with single tax rates, e.g., zip codes. Further, the tax rate table may contain information on international (e.g., cross-border), state, and local taxes, for example. Accordingly, when conducting a localized search, the processing center 312 may take the zip code from the merchant ID and/or the transaction location information and reference it against the tax rate table to determine a tax rate that was applied during the transaction. Alternatively, the processing center 312 may perform a remote search whereby the tax associated with the transaction is determined using one or more various websites. In this instance, the zip code or other relevant geographic descriptor, in the case of an international transaction, may be determined from the merchant ID and/or the transaction location information. The processing center 312 may then access one or more various websites to determine the tax rate(s) for the transaction location zip code or descriptor. Determining the tax rate may in either the local or remote search include first determining the type of transaction, e.g., e-commerce (online), face-to-face (in store), cross-border, or any combination thereof, because different types of transactions may have different tax rates within a single geographic area. One way to determine the type of transaction is to analyze the merchant ID and transaction location information. For example, if the merchant ID denotes a certain zip code, city, or register at the transacted merchant, the transaction may be considered a face-to-face transaction. If, however, the merchant ID denotes the transaction occurred through a website, the transaction may be considered an e-commerce transaction. The processing center 312 may then calculate the transaction tax amount using the transaction amount and the tax rate, and thereby deduct the transaction tax amount from the transaction amount to produce the pre-tax transaction amount used to determine product/SKU information as described herein.

The processing center 312 may additionally be configured to query a merchant website, which may include analyzing and reading the text contained within the website's pages, with attention being directed towards the description and price of the items. The website searched should be one affiliated with the transacted merchant. Thus, the processing center 312 may access the proper website using the information provided in the merchant ID.

The processing center 312 may determine whether only one item on the website has a price identical to the pre-tax transaction amount. This may involve parsing one or more pages of the website and one or more items on the website to identify prices of items located on the website. If only one item on the website has a price identical to the pre-tax transaction amount, the processing center 312 may retrieve an item ID specific to that item and may record the item ID within the itemized database 318. The item ID may include information such as the name and general description of the item, the price of the item, and the Stock Keeping Unit ("SKU") of the item, for example.

If, however, the processing center 312 identifies more than one item having a price identical to that of the pre-tax transaction amount or identifies combinations of two or more items having a summed price equal to the pre-tax transaction amount, then the processing center 312 may parse the website to identify those items and combinations, thereby giving them individual and different probability values evidencing the likelihood they were the item(s) purchased in the transaction. The probability values may be numerical, e.g., 0 to 1, or non-numerical, e.g., unsure to certain. The processing center 312 may be configured to give combinations with lower numbers of items higher probability values than those combinations with higher numbers of items. For example, a combination with one item may receive a higher probability than a combination with two items, a combination with two items may receive a higher probability than a combination with three items, and so on.

Further, to produce accurate probability values, the processing center 312 may be configured to identify the transaction location within the transacted merchant establishment. Such location information may be obtained from the merchant ID. Further, the transaction location may be specific to a department of the establishment, e.g., electronics, home goods, clothing, etc., or may be specific to a point-of-sale terminal or register. If the establishment internal transaction location is known, and multiple items each have a price identical to the pre-tax transaction amount, the processing center 312 may give an item associated with the transaction location a higher probability value than that of an item not associated with the transaction location. Additionally, when combining items whose summed prices equal the pre-tax transaction amount, the processing center 312 may "cluster" the items according to known techniques. For example, if electronics or a point-of-sale terminal within electronics is indicated as the internal transaction location, the processing center may cluster items sold within the electronics department and give them a higher probability value than clustered items not being part of the electronics department. That is to say, item combinations with items associated with the transaction location may receive a higher probability value than those combinations with some or no items associated with the transaction location. For example, the processing center 312 may give a higher probability value to a combination comprising a TV and a DVD player than a combination comprising a TV and a toaster.

To even further assist in producing accurate probability values, the processing center 312 may profile a consumer account affiliated with a payment device used in the transaction. That is, previous transaction records of the payment device may be analyzed to determine purchasing trends. For example, if a recent purchase occurred at a kitchen supply store, the processing center 312 may assumed that a transaction at another store shortly thereafter is more likely to involve the purchase of a toaster than a television. The duration of the previous transactions analyzed by the processing center 312 may be the duration of the payment device, or some shorter time determined to be more relevant to the analysis.

The processing center 312 may also retrieve the item ID(s) of a single item or of each item contained within the combination with the highest probability value and may record the item ID(s) within the itemized database 318. The item ID(s) may include various information, such as the name and general description of the item(s), the price of the item(s), and the Stock Keeping Unit ("SKU") of the item(s), for example. While it has been described that the processing center 312 may retrieve the item ID(s) of the item or of each item contained within the combination with the highest probability value, a threshold probability value may be implemented. Thus, if the highest probability determined does not meet or exceed the threshold probability value, the processing center 312 may not retrieve any item ID and therefore may not record any item ID within the itemized database 318. This may be done to ensure accuracy of the information contained within the itemized database 318.

The terms "device" or "payment device" are used interchangeably herein to describe a card or device that may be presented by an account holder to engage in a transaction either face-to-face or in a remote transaction, such as an e-commerce transaction, telephone transaction, or mail order, for example. Payment devices may be physical cards in the conventional sense, including cards with conventional form factors, smaller or larger cards, cards of different shapes, key fobs, and the like. The cards may include body portions, e.g., laminated plastic layers of a payment card, chip packaging, and the like, memories associated with the body portions, and processors associated with the body portions and coupled to the memories. The memories may contain appropriate applications. The processors may be operative to execute one or more method steps. The applications may be, for example, application identifiers linked to software code in the form of firmware plus data in a card memory such as an electrically erasable programmable read-only memory (EEPROM). Cards may conform to the ISO/IEC 7810 ID-1 format for example (also referred to as "conventional form factor"). However, payment devices may also represent handheld or other electronic devices that provide the same or similar functionality as described herein.

The computer systems and servers described herein each contain a memory that will configure associated processors to implement methods, steps, and functions described. Such methods, steps, and functions may be carried out, e.g., by processing capability on various system elements or by any combination of elements. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor may retrieve the information from the network.

Accordingly, it will be appreciated that one or more aspects of a system may include a computer program comprising computer program code means adapted to perform one or more steps described when such program is run on a computer, and that such program may be embodied on a tangible computer readable recordable storage medium; for example, in the form of distinct software modules which then execute on one or more hardware processors. Further, a system may include a computer comprising code adapted to cause the computer to carry out one or more steps, together with one or more apparatus elements or features. In various embodiments, software may be implemented in hardware components such as application specific integrated circuits (ASICs). Implementation of a hardware state machine to perform the functions described herein will be apparent to persons skilled in the relevant art(s).

Computers discussed herein may be interconnected, for example, by one or more of network, another virtual private network (VPN), the Internet, a local area and/or wide area network (LAN and/or WAN), via an EDI layer, and so on. The computers may be programmed, for example, in compiled, interpreted, object-oriented, assembly, and/or machine languages, for example, one or more of C, C++, Java, Visual Basic, and the like (an exemplary and non-limiting list), and may also make use of, for example, Extensible Markup Language (XML), known application programs such as relational database applications, spreadsheets, and the like. The computers may be programmed to implement the methods, steps and logic described.

As described herein a network may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse, combinations thereof and/or any suitable communication or data input modality.

Databases or data warehouses discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art.

The computers discussed herein may provide a suitable website or other Internet-based graphical user interface which is accessible by users.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, may be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. It should be appreciated that in the appended claims, reference to an element in the singular is not intended to mean "one and only one" unless explicitly so stated, but rather "one or more."

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

What is claimed is:

1. A method for identifying items of a transaction comprising the steps of:
   recording transaction information to a transaction information database;
   retrieving at least a portion of the transaction information from the transaction information database, the at least a portion of the transaction information being specific to a single transaction and including one or more of a merchant ID, a transaction amount, and a transaction location;
   determining a tax rate associated with the transaction;
   removing taxes applied during the transaction from the transaction amount, thereby producing a pre-tax transaction amount;
   querying a website affiliated with a merchant involved in the transaction;
   determining whether one or more items each have a price identical to the pre-tax transaction amount;
   clustering the one or more items;
   profiling a consumer account affiliated with a payment device used in the transaction;
   generating probability values for the one or more items;
   retrieving an item ID from the website, the item ID being affiliated with an item of the one or more items with the highest probability value; and
   recording the item ID in an itemized database.

2. The method of claim 1 further comprising the step of:
   determining whether one or more combinations of two or more items have a summed price identical to the pre-tax transaction amount.

3. The method of claim 2 further comprising the step of:
   retrieving an item ID for each item within a combination of two or more items having the highest probability value.

4. The method of claim 1 wherein the determining a tax rate step includes accessing a database having a table including tax rate information.

5. The method of claim 1 wherein the determining a tax rate step includes accessing a website containing tax rate information.

6. The method of claim 1 wherein the querying a website step includes accessing a website affiliated with a merchant name contained within the merchant ID.

7. The method of claim 1 wherein the profiling step includes analyzing previous transactions associated with the consumer account to determine a purchasing trend.

8. A system for identifying transaction items comprising:
   a memory including a transaction information database and an itemized database;
   a processor operatively coupled to the memory; and
   a persistent storage device operatively coupled to the memory and storing in a non-transitory manner instructions which when loaded into the memory cause the processor to be operative to:
      store transaction information within the transaction information database, the transaction information including a merchant ID, a transaction amount, and a transaction location;
      retrieve the transaction information pertaining to a single transaction;
      determine a tax rate associated with the transaction;
      generate a pre-tax transaction amount using the transaction amount and the tax rate;
      parse a website affiliated with information contained within the merchant ID;
      determine whether an item on the website has a price equal to the pre-tax transaction amount;
      retrieve an item ID for the item having a price equal to the pre-tax transaction amount; and
      record the item ID within the itemized database.

9. The system of claim 8 wherein the processor is further operative to profile a consumer account affiliated with a payment device used in the single transaction.

10. The system of claim 8 wherein the processor is further operative to determine whether combinations of items on the website have summed prices equal to the pre-tax transaction amount.

11. The system of claim 10 wherein the processor is further operative to cluster the items according to their association with areas within a transacted merchant establishment.

12. The system of claim 10 wherein the processor is further operative to generate probability values for the combinations of items.

13. The system of claim 8 wherein the item ID includes at least one of an item description and an item stock keeping unit number.

14. The system of claim 8 wherein the tax rate is determined using a tax rate table contained within a database.

15. A method for identifying an item of a transaction comprising the steps of:
   accessing transaction information contained within a transaction information database, the transaction information include a merchant ID and a transaction amount;
   determining a pre-tax amount for the transaction;
   parsing a website affiliated with the merchant ID;
   determining whether one or more single items on the website have prices equal to the pre-tax amount;
   determining an area within a transacted merchant establishment where the transaction occurred;
   assigning a probability value to each of the one or more single items using the area within the transacted merchant establishment where the transaction occurred; and
   storing an item ID for an item having the probability value that is greater than the probability value of the other of the one or more single items.

16. The method of claim 15 wherein the determining a pre-tax amount includes accessing a tax rate table including at least one of international, domestic, or local tax rate information.

17. The method of claim 15 wherein the determining a pre-tax amount includes accessing a website having tax rate information.

18. The method of claim 15 further comprising the step of:
   determining a transaction type of the transaction.

19. The method of claim 15 wherein the determining an area step includes determining a department within the transacted merchant establishment where the transaction occurred.

20. The method of claim 15 wherein the determining an area step includes determining a point-of-sale within the transacted merchant establishment where the transaction occurred.

\* \* \* \* \*